United States Patent
Ros-Giralt

(10) Patent No.: US 11,805,034 B1
(45) Date of Patent: Oct. 31, 2023

(54) SYSTEMS AND METHODS FOR DETECTING LARGE NETWORK FLOWS

(71) Applicant: Reservoir Labs, Inc., New York, NY (US)

(72) Inventor: Jordi Ros-Giralt, Newport Beach, CA (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 15/834,862

(22) Filed: Dec. 7, 2017

Related U.S. Application Data

(60) Provisional application No. 62/431,133, filed on Dec. 7, 2016.

(51) Int. Cl.
| | |
|---|---|
| H04L 12/28 | (2006.01) |
| H04L 43/022 | (2022.01) |
| H04L 47/2483 | (2022.01) |
| H04J 1/16 | (2006.01) |
| H04L 43/024 | (2022.01) |
| H04L 47/2441 | (2022.01) |
| H04L 47/24 | (2022.01) |

(52) U.S. Cl.
CPC ............ *H04L 43/024* (2013.01); *H04L 47/24* (2013.01); *H04L 47/2441* (2013.01)

(58) Field of Classification Search
CPC ... H04L 43/026; H04L 43/022; H04L 43/024; H04L 47/2441; H04L 43/0894; H04L 67/568; H04L 67/1008
USPC ........................................... 711/118; 370/235
See application file for complete search history.

(56) References Cited

U.S. PATENT DOCUMENTS

| | | |
|---|---|---|
| 7,237,007 B2 | 6/2007 | Kamath et al. |
| 9,246,828 B1 | 1/2016 | Tagore |
| 9,929,933 B1 | 3/2018 | Viljoen |
| 9,979,624 B1 | 5/2018 | Volpe et al. |
| 10,003,515 B1 | 6/2018 | Whiteside et al. |
| 10,033,613 B1 | 7/2018 | Whiteside et al. |
| 10,097,464 B1 | 10/2018 | Conlon et al. |
| 10,129,135 B1 | 11/2018 | Viljoen |

(Continued)

FOREIGN PATENT DOCUMENTS

| | | |
|---|---|---|
| CN | 104219110 A | 12/2014 |
| CN | 106603410 B | 11/2019 |

(Continued)

OTHER PUBLICATIONS

Basat R.B., et al., "Optimal Elephant Flow Detection," in Proc. IEEE Infocom, Jan. 15, 2017, 10 pages.

(Continued)

*Primary Examiner* — Wutchung Chu
*Assistant Examiner* — Jason A Harley
(74) *Attorney, Agent, or Firm* — Seyfarth Shaw LLP

(57) ABSTRACT

In a system for efficiently detecting large/elephant flows in a network, the rate at which the received packets are sampled is adjusted according to the measured heavy tailedness of the arriving traffic, such that the measured heavy tailedness reaches a specified target level. The heavy tailedness is measured using the estimated sizes of different flows associated with the arriving packets. When the measured heavy tailedness reaches and remains at the specified target level, the flows having the largest estimated sizes are likely to be the largest/elephant flows in the network.

24 Claims, 5 Drawing Sheets

(56) References Cited

U.S. PATENT DOCUMENTS

| | | | |
|---|---|---|---|
| 10,924,418 B1 | 2/2021 | Gudibanda et al. | |
| 2006/0149841 A1* | 7/2006 | Strub | H04L 43/026 709/225 |
| 2007/0016666 A1* | 1/2007 | Duffield | H04L 41/0896 709/223 |
| 2009/0303879 A1* | 12/2009 | Duffield | H04L 47/41 375/253 |
| 2009/0303901 A1* | 12/2009 | Duffield | H04L 43/024 370/253 |
| 2010/0161791 A1 | 6/2010 | Duffield et al. | |
| 2010/0332868 A1* | 12/2010 | Tan | G06F 1/3206 713/310 |
| 2013/0227501 A1* | 8/2013 | Yang | G06F 30/398 716/102 |
| 2014/0059095 A1* | 2/2014 | Adams | G06F 7/544 708/200 |
| 2015/0089045 A1 | 3/2015 | Agarwal et al. | |
| 2016/0261510 A1 | 9/2016 | Burnette et al. | |
| 2017/0195238 A1* | 7/2017 | Luo | H04L 47/2441 |
| 2017/0237673 A1* | 8/2017 | Law | H04L 47/25 370/338 |
| 2019/0238461 A1 | 8/2019 | Miller et al. | |

FOREIGN PATENT DOCUMENTS

| | | |
|---|---|---|
| EP | 3340551 A1 | 6/2018 |
| WO | 2003051078 A1 | 6/2003 |
| WO | 2019148041 A1 | 8/2019 |

OTHER PUBLICATIONS

Cook J.D., "Numerical Computation of Stochastic Inequality Probabilities," Univ. Of Texas, MD Anderson Cancer Center Department of Biostatistics Working Paper Series, Paper 46 (First published in 2003; revised in 2005 and 2008), 14 pages, 2008, available at https://www.johndcook.com/numerical_inequality_probabilities.pdf.

Cormode G., et al., "An Improved Data Stream Summary: The Count-Min Sketch and its Applications," J. Algorithm., Comput. Technol., vol. 55, No. 1, Feb. 4, 2004, pp. 58-75.

Einziger G., et al., "Independent Counter Estimation Buckets," in Proc. IEEE Infocom, vol. 26, 2015, pp. 2560-2568.

Fioreze T., et al., "A Statistical Analysis of Network Parameters for the Self-Management of Lambda-Connections", IFIP International Federation for Information Processing 2009, Aims, LNCS 5637, 2009, pp. 15-27.

Jadidi Z., et al., "Intelligent Sampling Using an Optimized Neural Network", Journal of Networks, Jan. 2016, pp. 16-27.

Lan K.C., et al., "A Measurement Study of Correlations of Internet Flow Characteristics", Computer Networks, vol. 50, No. 1, 2006, 28 pages.

Psounis K., et al., "SIFT: A Simple Algorithm for Tracking Elephant Flows, and Taking Advantage of Power Laws," 2005, 10 pages, available at http://www.stanford.edu/balaji/papers/05sifta.pdf.

Ros-Giralt J., et al., "High-Performance Algorithms and Data Structures to Catch Elephant Flows", 2016 IEEE High Performance Extreme Computing Conference (HPEC), IEEE, Sep. 13-15, 2016, 7 pages.

Sarvotham S., et al., "Connection-Level Analysis and Modeling of Network Traffic," in Proc. 1st ACM SIGCOMM Workshop on Internet Measurement, 2001, pp. 99-103.

Yi L., et al., "ElephantTrap: A Low Cost Device for Identifying Large Flows," in Proc. 15th Annual IEEE Symposium on High-Performance Interconnects, Hot Interconnects, 2007, pp. 99-105.

Choi B-Y., et al., "Adaptive Packet Sampling for Accurate and Scalable Flow Measurement", IEEE Global Telecommunications Conference, 2004, GLOBECOM '04, 2004, pp. 1448-1452, vol. 3, DOI: 10.11 09/GLOCOM.2004.1378222, (Year: 2004).

Poupart P., et al., "Online Flow Size Prediction for Improved Network Routing", 2016 IEEE 24th International Conference on Network Protocols (ICNP), 2016, pp. 1-6, DOI:10.1109/ICNP.2016.7785324, (Year: 2016).

* cited by examiner

*Pseudocode 1: The base BubbleCache algorithm*

*Algorithm BubbleCache*
$\Phi$ : *Targeted accuracy parameter*
$\delta_p$ : *Sampling rate step size*
$T_i$ : *Inactivity timeout*
$T_h$ : *Housekeeping routine timeout*
$t$ : *The current time*
$C_\alpha(t)$ : *The state of the flow cache at time t*
$x_i$ : *The current size of flow i*
$m$: *flow size metric*
*Upon receiving a packet from an arbitrary flow* $f_i$ :
   *Sample the packet with a probability* $p(t)$ ;
   *If the packet is sampled:*
     *If the packet's flow is not in* $C_\alpha(t)$ :
       *Add a new flow record to* $C_\alpha(t)$ *for the packet's flow;*
   *Update* $x_i$ *according to the size metric m;*
*Every* $T_h$ *units of time:*
   *If undersampling(), increase* $p(t)$ *by* $\delta_p$ ;
   *Otherwise, reduce* $p(t)$ *by* $\delta_p$ ;
   *Remove flows from* $C_\alpha(t)$ *that have been inactive for* $T_i$ ;
*Function undersampling():*
   *If* $P(e_\alpha(t) = 0)$ *is lower than* $\Phi$ , *return true;*
   *Else, return False;*

FIG. 4A

*Pseudocode 2: undersampling() function with kurtosis*

*Function undersampling():*

*If* $Kurt[\{x_1, x_2, ..., x_{|F|}\}]$ *is lower than* $\Phi$ :

*Return true;*

*Else:*

*Return False;*

FIG. 4B

SYSTEMS AND METHODS FOR DETECTING LARGE NETWORK FLOWS

CROSS-REFERENCE TO RELATED PATENT APPLICATIONS

This application claims benefit of priority to U.S. Provisional Patent Application Ser. No. 62/431,133 entitled "Systems and Methods Implementing High-Performance Priority Queues to Protect QoS-Sensitive Flows," filed on Dec. 7, 2016, the contents of which are incorporated herein by reference in their entirety.

STATEMENT OF GOVERNMENT SUPPORT

This invention was made with government support under Award No. DE-SC0011358 awarded by the U.S. Department of Energy. The government has certain rights in the invention.

FIELD OF THE INVENTION

This disclosure generally relates to sampling and analyzing network flows and, in particular, to tuning the rate of sampling such that relatively large flows can be distinguished from relatively small flows.

BACKGROUND

A general objective in the design of high-performance computer networks is to guarantee the quality of service (QoS) experienced by the data flows that traverse them. This objective is often challenged by the presence of very large flows—also known as elephant flows—due to their adverse effects on smaller delay-sensitive flows (sometimes referred to as mouse flow). Because in typical networks both large and small flows share common resources, network operators are interested in actively detecting elephant flows and using QoS mechanisms for redirecting and scheduling them to protect the smaller flows. Consider, for example, a flow associated with the transfer of a large (e.g., tens, hundreds, or thousands of megabytes, a few, tens, hundreds of gigabytes, etc.) file (an example of an elephant flow), and short messages sent periodically by sensors at a chemical plant, or a flow associated with real time voice over Internet protocol (VoIP) conversation (examples of mouse flows). In case of network congestion, it is generally desirable not to block or delay the mouse flows, i.e., to guarantee some degree of QoS to such flows, so that communications such as VoIP do not suffer from significant quality degradation. In general, such a scheduling cannot be performed and/or QoS guarantee cannot be provided unless the operator and/or network processor can distinguish between elephant and mouse flows, while the flows are in progress.

SUMMARY

Various embodiments described herein feature techniques for efficiently detecting elephant flows at very high (several megabits per second (Mbps), tens or hundreds of Mbps, gigabits per second (Gbps), tens or hundreds of Gbps, etc.) speed rates and under uncertainty. Sources of uncertainty can come from either a natural inability to predict the traffic's future performance and/or from artifacts introduced by networking equipment such as involuntary packet drops or voluntary packet sampling by network processing protocols such as sFlow™.

Various embodiments described herein can achieve high performance in detecting large/elephant flows by determining and operating at a data or packet sampling rate that can capture at least the minimum amount of information needed to detect accurately the largest flows in a network. Specifically, a desirable packet sampling rate is determined by analyzing a distribution of the estimated sizes of flows in the network. That rate is then used to sample the packets and to update the estimated flow sizes, which can then be used to update the sampling rate, if necessary. This iterative process can be on-going, and the regularly updated flow sizes can be used to distinguish large/elephant flows from small/mouse flows.

Accordingly, in one aspect, a method is provided for classifying network flows, e.g., as large/elephant flows and small/mouse flows. The method includes selecting a sampling rate (e.g., an initial sampling rate), sampling a number of packets arriving at a processing node at the sampling rate, and identifying one or more flows, where each flow is associated with at least one sampled packet. The method also includes selecting/generating a cache of flows from the several identified flows, estimating a respective size of each flow in the cache, and computing a heavy tailedness of the cache of flows based on respective sizes thereof. In addition, the method includes adjusting the sampling rate based on the computed heavy tailedness, if the computed heavy tailedness is outside of a specified range from a specified target heavy tailedness, and classifying as large/elephant flows in the cache of flows a subset of flows having respective sizes larger than respective sizes of all other flows in the cache. The other flows in the cache may be classified as small/mouse flows.

In some embodiments, prior to any adjustment, the sampling rate (i.e., the initially selected sampling rate) is in a range from 0.000001 up to 1.0 and, after one or more adjustments, the sampling rate (i.e., the adjusted sampling rate) is in a range from 0.00001 up to 0.1. A sampling rate of 1.0 implies that each arriving packet is sampled. A sampling rate of 0.01 implies that one in 100 arriving packets is sampled. The rate of arrival of packets at the processing node can be in a range from 100 megabits per second (Mbps) up to 10 terabits per second (Tbps). Rates below and above this range are also contemplated. Selecting the sampling rate may include initially selecting a sampling rate that is inversely proportional to the rate of arrival of packets at the processing node.

In some embodiments, identifying a flow associated with a sampled packet includes designating the sampled packet to a particular flow based on one or more of: a pair of source and destination addresses (e.g., Internet Protocol (IP) addresses) in the header of the sampled packet; a pair of source and destination port numbers in the header of the sampled packet; and a virtual local area network (VLAN) identifier included in the header of the sampled packet. Additionally in the alternative, identification of the flow may also be based on the type and/or identity of an application (e.g., email, file transfer protocol (FTP), etc.) with which the sampled packet is associated.

In some embodiments, the cache of flows is selected or generated by including in the cache each flow in the one or more identified flows. Selecting the cache of flows may also include determining that no additional sampled packets were associated with a particular flow during an inactivity timeout period, and removing that particular flow (that was deemed inactive) from the cache of flows. The size of a flow may be based on a metric such as: (i) a number of packets belonging to a flow at a time of estimation, (ii) a number of bytes belonging to the flow at the time of estimation, (iii) an average number of packets belonging to the flow per unit time, (iv) an average number of bytes belonging to the flow per the unit time, and (v) bustiness of the flow. The flow size may also be based on other metrics that may be used to describe the flow size, and can be a combination of two or more metrics listed above and/or other metrics. Estimating the size of the flow may include computing one or more metrics.

In some embodiments, computing the heavy tailedness of the cache of flows includes computing at least one of: variance of the respective flow sizes; skewness of the respective flow sizes; and kurtosis of the respective flow sizes. After adjusting the sampling rate, the sampling rate may not adjusted at least for a specified rate adjustment interval. Adjusting the sampling rate may include one of: increasing the sampling rate if the computed heavy tailedness is less than the specified target heavy tailedness; and decreasing the sampling rate if the computed heavy tailedness is greater than the specified target heavy tailedness. Increasing the sampling rate may include increasing the sampling rate by a selected step size, and decreasing the sampling rate may include decreasing the sampling rate by the same selected step size or a different selected step size.

In another aspect, a system is provided for classifying network flows, e.g., as large/elephant flows and small/mouse flows. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The processing unit may be a part of a networking system, such as a network processor at a node, or can be a part of a network processor.

The instructions in the first memory configure the processing unit to: select a sampling rate (e.g., an initial sampling rate), sample a number of packets arriving at a processing node at the sampling rate, and identify one or more flows, where each flow is associated with at least one sampled packet. In addition, the instructions program the processing unit to select/generate a cache of flows from the several identified flows, estimate a respective size of each flow in the cache, and compute a heavy tailedness of the cache of flows based on respective sizes thereof. The instructions further program the processing unit to adjust the sampling rate based on the computed heavy tailedness, if the computed heavy tailedness is outside of a specified range from a specified target heavy tailedness, and to classify as large/elephant flows in the cache of flows, a subset of flows having respective sizes larger than respective sizes of all other flows in the cache. The instructions may program the processing unit to classify the other flows in the cache as small/mouse flows. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, for classifying network flows, e.g., as large/elephant flows and small/mouse flows. The instructions configure the processing unit to: select a sampling rate (e.g., an initial sampling rate), sample a number of packets arriving at a processing node at the sampling rate, and identify one or more flows, where each flow is associated with at least one sampled packet. In addition, the instructions program the processing unit to select/generate a cache of flows from the several identified flows, estimate a respective size of each flow in the cache, and compute a heavy tailedness of the cache of flows based on respective sizes thereof.

The instructions further program the processing unit to adjust the sampling rate based on the computed heavy tailedness, if the computed heavy tailedness is outside of a specified range from a specified target heavy tailedness, and to classify as large/elephant flows in the cache of flows, a subset of flows having respective sizes larger than respective sizes of all other flows in the cache. The instructions may program the processing unit to classify the other flows in the cache as small/mouse flows. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIGS. 4A and 4B show the process of adjusting the sampling rate and identifying elephant flows, according to various embodiments;

DETAILED DESCRIPTION

To understand the operation of various embodiments, a theoretical framework is first introduced which provides two key building blocks. First, the framework presents exact formulas to compute a detection likelihood. These formulas reveal the necessary logic to ensure the elephant-flow-detection process can target an operational regime near an optimized tradeoff between computational scalability and accuracy. Second, the framework introduces the flow "reconstruction lemma," which states that if the sampled traffic is heavy tailed, then the detection system can operate error free with high probability (e.g., probability of greater than 0.6, 0.8, 0.85, 0.9, or more). This lemma provides the necessary logic to ensure the convergence and stability of the detection process. The theoretic framework is then used to design the BubbleCache algorithm, a high performance flow cache process that captures the top largest (elephant) flows by dynamically tracking the optimal cutoff sampling rate determined according to the estimated properties, e.g., heavy tailedness, of the network traffic to be processed.

On the Effect of Sampling

Figure 1:
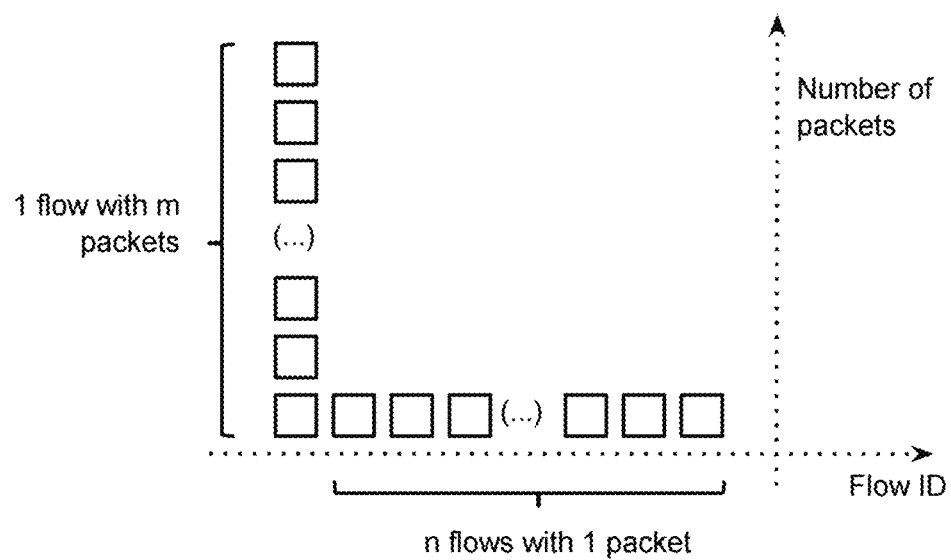
FIG. 1 depicts a simple, example heavy-tailed traffic dataset.

Consider a simple initial problem with a traffic dataset including one single flow carrying m packets and n flows carrying one single packet, each. FIG. 1 shows the packet distribution corresponding to this traffic dataset. Our interest is in finding a sampling strategy that allows us to identify the largest flow without necessarily processing all the traffic—that is, performing the detection under partial information. To resolve this problem, we observe that if we sample two packets from the elephant flow, then we can assert with certainty which flow is the biggest, since none of the other flows has more than one packet. In particular, let X (k) be the number of packets sampled from the elephant flow out of a total of k samples taken from the traffic dataset. Then the probability of identifying the elephant flow with certainty is:

$$P(X(k) \geq 2) = 1 - P(X(k)=0) - P(X(k)=1) \quad (1)$$

Using combinatorics, it can be seen that the equation ruling $P(X(k) \geq 2)$ corresponds to:

$$P(X(k) \geq 2) = \begin{cases} 1 - \dfrac{\binom{n}{k}}{\binom{m+n}{k}} - \dfrac{m\binom{n}{k-1}}{\binom{m+n}{k}}, & \text{if } 2 \leq k \leq n \\ 1 - \dfrac{m}{\binom{m+n}{n+1}}, & \text{if } k = n+1 \\ 1, & \text{if } n+1 < k \leq n+m \end{cases} \quad (2)$$

Figure 2:
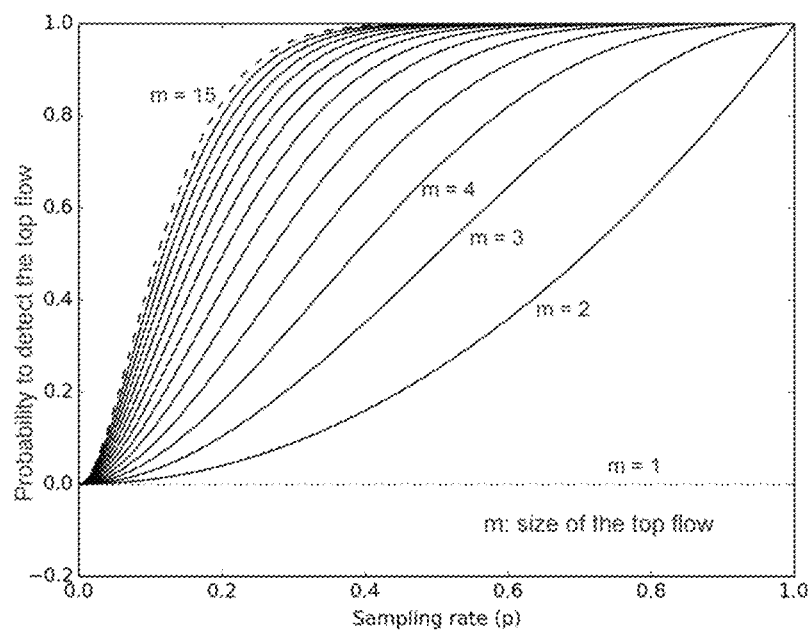
FIG. 2 illustrates the probability of detecting the top flow in a simplified traffic model, as a function of sampling rate.

FIG. 2 shows a plot of Equation (2) for the case n=1000, with m varying from 1 to 15 and with k=p (m+n), where p is a sampling rate parameter between 0 and 1. We notice that:

For the boundary case m=1, the probability of finding the elephant flow is trivially zero, since the elephant flow is indistinguishable from the small flows.

As we increase the sampling rate p, the probability of finding the elephant flow increases.

As the number of packets in the elephant flow m increases, we need less samples to gain a higher probability of finding it.

The intuition behind the previous result is as follows. Suppose that as observers of the network we see 10 packets from flow $f_1$ and 10 packets from flow $f_2$. We realize that we do not have enough information to make a good judgement as to which of the two flows is the largest. Suppose that instead, we see 100 packets from $f_1$ and 10 packets from $f_2$. If we had to make a guess, it seems reasonable to guess that $f_1$ is the largest of the two flows, but we may still not be convinced as we cannot predict the future behavior of the two flows. Now consider the case of seeing 1,000,000 packets from flow $f_1$ and only 10 packets from flow $f_2$. The chances of $f_2$ being the largest flow are now lower, as it would need to transmit a very large number of packets to catch up with $f_1$. The logic of this reasoning is captured by Equation (2).

Another interpretation of Equation (2) in our simple network model is that it allows us to measure the likelihood of detecting the elephant flow as a function of uncertainty or the degree of partial information. When the sampling rate p is 1 (i.e., all arriving packets are sampled and analyzed), we have complete information and we can identify the elephant flow with certainty. As the sampling rate decreases to zero, the degree of partial information increases and the likelihood to detect the elephant flow(s) accurately decreases. In general, there are two sources of uncertainty that determine the effective sampling rate of our detection problem:

Future uncertainty. Unlike oracles, we generally cannot predict the traffic that each flow will transmit in the future. To avoid this source of uncertainty, we need to wait until the last packet of all flows has been transmitted, but this is not practical since the objective of detecting elephant flows is to perform timely traffic engineering decisions while the flows are still active.

Past uncertainty. Even if we could predict the future traffic transmitted by each flow, often networking equipment cannot keep up with the rates at which packets are processed in the data plane. For instance, in today's networks, it is computationally expensive to monitor every single packet going through a 100 Gbps link. Under these conditions, packets often need to be sampled or dropped, adding another source of uncertainty.

In the theoretical and algorithmic results presented herein, we assume the network is under the influence of either one or both of these sources of uncertainty.

We also contrast the implications of Equation (2) in our simple network model with the typical, real world Internet traffic. Internet Protocol (IP) traffic is commonly characterized by heavy tailedness, a condition in which the traffic includes of a small number (e.g., 1, 5, 10, 40, 100, 250, etc.) of flows where each flow transmits a very large amount of data (e.g., a few, tens, or hundreds of megabytes, a few, tens, or hundreds of gigabytes, or more), and a large number (e.g., tens, hundreds, thousands, hundreds of thousands, ore more) of flows transmitting a small amount (e.g., a few bytes, a few kilobytes, a few megabytes, etc.) of data. As our simple example illustrates, this natural, typical characteristic of Internet traffic can work in favor of detecting the elephant flows with high likelihood under partial information: a larger value of m, typically implies a higher degree of heavy tailedness. Alternatively or in addition, a large value of n, i.e., a large number small flows may also imply a higher degree of heavy tailedness, which generally leads to a higher likelihood of detecting the elephant flow.

Thus, our simple example described with reference to FIG. 2 offers some initial insights on the problem of elephant flow detection under partial information but its usefulness is limited in that it deals with a simple traffic dataset model representing one flow transmitting m packets and n flows, each transmitting a single packet. In the following discussion, we derive a generalized equation of the likelihood of detecting large/elephant flows for arbitrary, i.e., generalized traffic distributions.

Generalization to Arbitrary Distributions

We start by introducing the definition of quantum error which will allow us to characterize the concept of detection likelihood for arbitrary, generalized traffic distributions:

Definition 1. Quantum error (QER). Let F be a set of flows transmitting information over a network and let x(t) be a vector such that its i-th element, $x_i(t)$, corresponds to the size of flow $f_i$ at time t according to some metric m. Examples of size metrics can be: (i) a number of packets belonging to a flow at a time of estimation, (ii) a number of bytes belonging to the flow at the time of estimation, (iii) an average number of packets belonging to the flow per unit time, (iv) an average number of bytes belonging to the flow per the unit time, and (v) bustiness of the flow, etc. The vector x(t) is therefore a time-varying vector such that $x_i(t_b)=0$ and $x_i(t_e)=\sigma_i$, where $t_b$ and $t_e$ are the times at which the first and the last bit of information are transmitted from any of the flows, and $\sigma_i$ is the size of flow $f_i$ at time $t_e$. Assume without loss of generality that $\sigma_i \geq \sigma_{i+1}$ and let $F_\alpha=\{f_1, f_2, \ldots, f_\alpha\}$ be the set with the $\alpha$ largest flows according to their size at time $t_e$, $\sigma_i$, for $\alpha \leq |F|$. Finally, let $C_\alpha(t)$ be a cache storing the top $\alpha$ largest flows according to their size at time t, $x_i$ (t). (Hence, by construction, $C_\alpha(t_e)=F_\alpha$.) We define the quantum error (QER) produced by the cache at time t as:

$$e_\alpha(t) = \frac{|F_\alpha \setminus C_\alpha(t)|}{\alpha} = \frac{|\{x_i(t) \text{ s.t. } \sigma_i \leq \sigma_\alpha \text{ and } x_i(t) > x_\alpha(t)\}|}{\alpha} \quad (3)$$

Intuitively, the above equation corresponds to the number of small flows that at time t are incorrectly classified as top flows normalized, so that the error is 1 if all top $\alpha$ flows are misclassified. Because this error refers to the notion of an observer classifying a flow at an incorrect size order or level, we use the term quantum error or QER to describe this error. We can now formally introduce the concept of detection likelihood as follows: Definition 2. Top flow detection likelihood. The top flow detection likelihood of a network at time t is defined as the probability that the quantum error is zero: $P(e_\alpha(t)=0)$. In general, we will refer to this probability value simply as the detection likelihood.

Using the above definition, we can derive the detection likelihood equation: Lemma 1. Detection under partial information. The detection likelihood of a network at time t follows a multivariate hypergeometric distribution as follows:

$$P(e_\alpha(t) = 0) = P(C_\alpha(t) = F_\alpha) = \sum_{\forall x' \in Z(t)} \frac{\prod_{\forall i} \binom{\sigma_i}{x_i'}}{\binom{\sum_{\forall i} \sigma_i}{\sum_{\forall i} x_i(t)}} \quad (4)$$

where Z(t) is the zero quantum error region, expressed as:

$Z_\alpha(t) = \{x' \in \mathbb{N}^{|F|} | \Sigma_{\forall i} x'_i = E_{\forall i} x_i(t), x' \leq_p \sigma, x'_i > x'_j \forall i, j \text{ s.t. } i \leq \alpha, j > \alpha\}$ \quad (5)

At a certain time t, the set of flows F is, in general, a vector in $\mathbb{N}^{|F|}$, where $|F|$ is the number of flows. In a possible ordered combination, the flows are ordered in the decreasing order of estimated flow size, where flow $f_1$ is designated as the largest and flow $f_{|F|}$ is designated as the smallest. Not all of these orderings would correctly represent an ordering based on the actual flow sizes $\sigma_i$, however. In other words, a flow $f_j$ that is smaller than the top $\alpha$ actual largest flows may be erroneously ordered as part of the first a flows. The vector x' represents all possible orderings, and $x'_i$ represents the estimated size of the flow $f_i$ in any one of such orderings. In Equation (5), $\alpha \leq_p$ b means that b is at least as Pareto efficient as $\alpha$. Therefore, for any ordering, the estimated sizes of the flows cannot exceed their respective actual sizes a, that can be determined at time $t_e$, when the flows end.

Proof Assume a discrete fluid model of the network in which each flow i needs to transmit a number of water droplets equal to its size metric $\sigma_i$. Flows transmit water through the network one droplet at a time and each droplet is transmitted at arbitrary times. By convention, we will assume that the first and last droplets from any of the flows are transmitted at times 0 and $t_e$, respectively. An observer of the network performs only one task: counting the number of droplets each flow has transmitted and storing such information in a vector x(t), where each component $x_i$ (t) corresponds to the number of droplets seen from flow i up until time t. Based on this information, the objective is to quantify the probability that the set of flows $C_\alpha(t)$ is the same as the set of flows in Fa.

At time t, the total number of droplets transmitted is $\Sigma_{\forall i} x_i$ (t) out of a total number of $\Sigma_{\forall i} \sigma_i$ droplets. The total number of possible ways in which $\Sigma_{\forall i} x_i$ (t) droplets are transmitted is given by this expression:

$$\binom{\sum_{\forall i} \sigma_i}{\sum_{\forall i} x_i(t)} \quad (6)$$

Only a subset of the total number of ways in which droplets are transmitted correspond to the case of zero quantum error. In particular, those vectors x' that satisfy the following conditions:
  The total number of droplets transmitted, $\Sigma_{\forall i} x'_i(t)$, is equal to $\Sigma_{\forall i} x_i$ (t).
  The number of droplets transmitted by a flow cannot be larger than its size metric: $x' \leq_p \sigma$
  The top $\alpha$ flows, $f_1, f_2, \ldots, f_\alpha$, are captured by the set $C_\alpha(t)$, that is, $x'_i > x'_j$ for all i and j such that $i \leq \alpha$ and $j > \alpha$.

The above three conditions define the zero quantum error region as expressed in Equation (5) and its cardinality is as follows:

$$|Z_\alpha(t)| = \sum_{\forall x' \in Z(t)} \prod_{\forall i} \binom{\sigma_i}{x'_i} \quad (7)$$

The probability that the quantum error is zero, $P(e_\alpha(t)=0)$, can now be obtained from the division of Equation (7) by Equation (6). As a test of generality, Equation (4) can be shown to be a generalization of Equation (2) for arbitrary traffic distributions using Chu-Vandermonde identity. As such:

Corollary 1. Test of generality. The detection likelihood function presented in Equation (4) is equivalent to Equation (2) when the traffic dataset follows the example distribution shown in FIG. 2.

On the Minimum Information Needed to Detect Elephant Flows: Cutoff Sampling Rates From a practical standpoint, the detection likelihood $P(e_\alpha(t))$ in Equation (4) generally cannot be computed for times $t < t_e$ because the size of alls flows $\sigma_i$ is only known with certainty at time $t=t_e$. Nevertheless, Equation (4) reveals important properties related to the problem of elephant flow detection, that are discussed below.

Suppose that a network device inspects packets in real time with the goal of timely identifying the top one or more largest flows, where a flow size is determined by an arbitrary metric—e.g., packet counts, byte counts, average rate, etc. Assume that, due to limitations in both computing power and memory footprint, a network device such as a switch can only store in the cache a maximum of a flows. Then, the following statements about the detection likelihood equation (i.e., Equation (4)) are true:
  It provides, in general, the minimum number of samples we need to inspect (equivalently, the minimum amount of time we need to wait, in general) to make a classification decision that will be correct with a probability given by $P(e_\alpha(t)=0)$ or higher.
  It mathematically quantifies the trade-off between time and the quantum error: if we trade time by waiting longer to make a detection decision, we can reduce quantum error; if we trade quantum error, we can make a detection decision sooner.

From an information theory standpoint, a relevant question is to identify the minimum amount of information that needs to be sampled from the traffic dataset in order to detect the largest flows for a given detection likelihood. This problem is somewhat similar to the concept of Nyquist rate in the field of signal processing, which identifies the minimum number of samples that need to be taken from a signal in order to fully reconstruct it. The Nyquist rate for a signal to be sampled is determined, however, according to the frequency of a signal component that has the maximum frequency, where the value of the maximum frequency is known prior to computing the applicable Nyquist rate. Here, unlike determining the Nyquist rate, we do not know the respective total sizes $\sigma_i$ of the flows at the time at which the packet sampling rate is selected and/or adjusted. We now explore this problem in more detail through an example.

Figure 3:
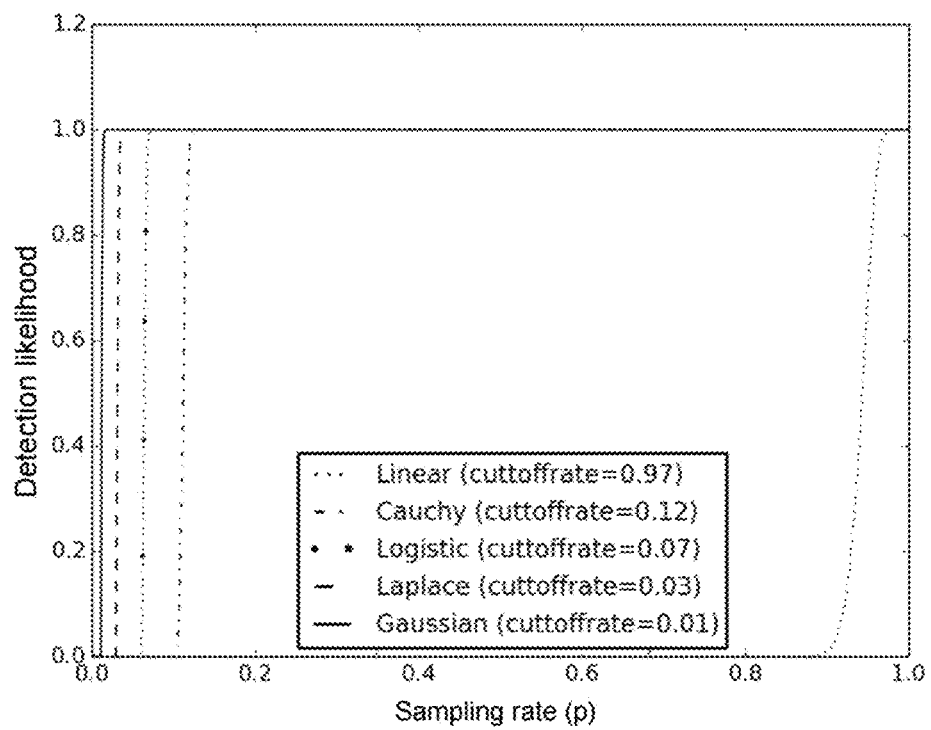
FIG. 3 shows the detection likelihood of some well-known traffic distributions.

Example 1. Minimum sampling rate of some well-known heavy tailed traffic distributions. Let F be the set of flows in a network and let $\sigma_i$ be the size of each flow i, for $1 \leq i \leq |F|$. Assume that $\sigma_i$ follows any of these well-known distribution functions:

| Laplace | Cauchy | Sech-squared | Gaussian | Linear |
| --- | --- | --- | --- | --- |
| $\sigma_i = \gamma \frac{1}{2} e^{-|i|}$ | $\sigma_i = \gamma \frac{1}{\pi(1+i^2)}$ | $\sigma_i = \gamma \frac{e^{-i}}{(1+e^{-i})^2}$ | $\sigma_i = \gamma \frac{e^{-i^2/2}}{\sqrt{2\pi}}$ | $\sigma_i = \gamma (|F| - i)$ | where $\gamma$ is chosen so that $\Sigma \forall_i \sigma_i$ is a constant. FIG. 3 plots the detection likelihood using Equation (4) for the case that $\Sigma \forall_i \sigma_i = 300$, $\alpha = 5$ and $|F| = 40$ when a fraction p of the traffic is sampled, for $0 \leq p \leq 1$.

The cutoff sampling rates (also called cutoff rates) that result in a detection likelihood of 0.99 are computed. As expected, for non-heavy tailed traffic patterns such as the linear distribution, the cutoff rate is high at p=0.97, while the cutoff rate for heavy tailed patterns such as the Gaussian distribution is much lower at p=0.01. For instance, in the case where the flow size metric corresponds to the number of packets in a flow, for the Gaussian, Laplace, Sech-squared, and Cauchy distributions it is enough to sample only 1%, 3%, 7%, and 12% of the total traffic dataset, respectively, in order to detect the five largest flows with a 99% chance of being correct.

It can be noticed in FIG. 3 that a small reduction of the sampling rate below its cutoff rate can result in a substantial reduction of the detection likelihood. On the other hand, increasing the sampling rate beyond the cutoff rate does not proportionately increase the detection likelihood. This property leads to significant optimization opportunities in the design of high performance elephant flow detection systems. Consider as an example the Laplace distribution. Reducing the sampling rate from 1 to 0.03 results in practically no detection penalty, but it leads to computational savings of about 97% or, equivalently, a computational acceleration of 33 times. These cutoff rates, which depend only on the statistical properties of the traffic, define optimized operational regimes that are key to the design of computationally efficient detection processes and systems as described below.

High-Performance Detection Techniques

A number of known elephant flow detection algorithms use packet sampling as a strategy to reduce computational complexity. These algorithms, however, treat the packet sampling rate as a constant or as an input that operators need to manually adjust. They do not provide any guidance as to when and/or how to adjust the sampling rate, e.g., to minimize the error in identifying elephant flows. Our framework leads to a packet sampling technique that can dynamically adjust the sampling rate towards tracking a detection likelihood target, i.e., towards the goal that the detection likelihood meets or exceeds a specified threshold. To the best of our knowledge, the technique we present in various embodiments is the first to exploit the concept of cutoff rates derived from properties of network traffic to compute the sampling rate for the detection process and to optimize a tradeoff between computational scalability and elephant-flow-detection accuracy. Because of its generality, our technique can be used both as an alternative to and/or also to enhance the known packet sampling based elephant flow detection algorithms.

We know that heavy tailed traffic characteristics such as those found in real world networks expose detection likelihood curves with well-defined cutoff rates, as illustrated in FIG. 3. Above the cutoff rate, the gains on the probability to accurately detect the largest flows are generally small. Below it, the penalties are typically large. A detection process can benefit from this property by tuning its sampling rate to target the cutoff rate, substantially (e.g., by 10%, 20%, 30%, 50%, 60%, or more) reducing the computational cost of processing traffic while allowing a small or negligible (e.g., less than 0.1%, 0.5%, 1%, 2%, 10%, etc.) error rate. This suggests that an example process shown in FIG. 4A can detect elephant flows at high speed traffic rates.

The central idea of the process shown in FIG. 4A, referred to as the Bubble Cache algorithm, is to sample packets at a rate p(t) which is updated to track a target detection likelihood: if the current detection likelihood $P(e_\alpha(t)=0)$ is lower than a target $\Phi$, then increase p(t); otherwise, maintain or decrease p(t). A practical limitation of the BubbleCache algorithm is that the calculation of the detection likelihood value, $P(e_\alpha(t)=0)$, because its formula, introduced in Equation (4), requires combinatorial operations that can quickly overwhelm the computational capabilities of modern computers and/or network processors.

In order to develop a computationally feasible approach to compute the detection likelihood, we first formalize the definition of heavy tailed traffic and introduce a main reconstruction lemma upon which our approach is based:
Definition 3. Heavy tailed traffic. Let F be a set of flows transmitting data over a network and assume $F_e$ and $F_m$ are the sets of elephant and mouse flows in F, respectively. Assume $\sigma_i$ corresponds to the size of flow $f_i$ according to some metric m. We say that the traffic dataset generated by the flows in F is heavy tailed if $|F| << |F_m|$ and $\sigma_i >> \sigma_j$ for any pair of flows $f_i$ and $f_j$ in $F_e$ and $F_m$, respectively.

We now state the reconstruction lemma which provides a roadmap for various embodiments of our elephant-flow-detection technique:
Lemma 2. Reconstruction under partial information. Let F be a set of flows transmitting data over a network and assume that the traffic dataset generated by the flows is heavy tailed according to Definition 3. Let also $x_i$ be the size of flow $f_i$ when traffic is sampled at a rate p, for $0 \leq p \leq 1$ and $1 \leq i \leq |F|$. Then the following are true:
(R1) There exists a cutoff sampling rate $p_c$ such that for any sampling rate $p \geq p_c$, $\sigma_i >> \sigma_j$ implies $x_i >> x_j$ with high probability.

(R2) The more heavy tailed the traffic data set is (as described in Definition 3) the lower the cutoff sampling rate $p_c$.

(R3) If the sequence $\{x_1, x_2, \ldots, x_{|F|}\}$ is heavy tailed, then $x_i \gg x_j$ implies $\sigma_i \gg \sigma_j$ with high probability.

(R4) If the sequence $\{x_1, x_2, \ldots, x_{|F|}\}$ is not heavy tailed, then either $p < p_c$ or the traffic dataset is not heavy tailed, or both.

The Reconstruction Lemma has practical implications in the design of high performance techniques for detecting elephant flows. In particular, from Lemma 2/R4, if $\{x_1, x_2, \ldots, x_{|F|}\}$ is not heavy tailed, then either the traffic has no elephant flows or the sampling rate is too small, i.e., $p < p_c$. As real world network traffic is typically heavy tailed (otherwise there would be no need to identify elephant flows to optimize network traffic), we can conclude that the sampling rate used (p) is less than the cutoff sampling rate ($p_c$) and, hence, that the sampling rate needs to be increased. If instead $\{x_1, x_2, \ldots, x_{|F|}\}$ is heavy tailed, then using Lemma 2/R3 we know that $x_i \gg x_j$ implies $\sigma_i \gg \sigma_j$ with high probability and, hence, that the elephant flows can be clearly separated from the mouse flows by measuring $\{x_1, x_2, \ldots, x_{|F|}\}$ without the need to know the actual sizes of the flows $\{\sigma_1, \sigma_2, \ldots, \sigma_{|F|}\}$.

This reduces the computationally hard problem of computing the detection likelihood $P(e_\alpha(t)=0)$ to the problem of measuring whether the input signal (the network traffic under measurement) is heavy tailed: if the measured network traffic is not characterized as heavy tailed, then $p \geq P_c$ and we can identify the elephant flows with high probability. If the measured traffic is not characterized as heavy tailed, we can increase the sampling rate until it can be characterized as heavy tailed.

Towards this objective, different techniques can be used to ascertain the heavy tailedness of the measured traffic. For example, the variance and/or skewness of $\{x_1, x_2, \ldots, x_{|F|}\}$ or a subset of $\{x_1, x_2, \ldots, x_{|F|}\}$ can be used. The fourth standardized moment, known also as the kurtosis, of $\{x_1, x_2, \ldots, x_{|F|}\}$ or a subset thereof can effectively provide the degree to which a signal is heavy tailed. The concept of using the heavy tailedness of the sampled, measured traffic to adjust the sampling rate is not limited to any particular technique for measuring the heavy tailedness. Any other techniques, including those that may be developed in the future, can be used to measure the heavy tailedness of $\{x_1, x_2, \ldots, x_{|F|}\}$ or a subset of, and that heavy tailedness can be used to adjust the sampling rate.

The intuition behind this approach is shown in the following table, which presents the kurtosis of the traffic data sets introduced in Example 1. As expected, the four heavy tailed data sets (Laplace, Cauchy, Sech-squared, and Gaussian distributions) present a high kurtosis (above 12), whereas the non-heavy tailed distribution (linear distribution) exposes a low kurtosis (−1.2). By using the kurtosis measurement, we can know if the sampled traffic dataset is heavy tailed and therefore if the detection likelihood is high according to Lemma 2.

| Linear | Laplace | Cauchy | Sech-squared | Gaussian |
|---|---|---|---|---|
| −1.2 | 25.88 | 20.54 | 12.11 | 18.86 |

An example pseudocode shown in FIG. 4B provides the adjustment that can be made to the base process discussed with reference to FIG. 4A, to facilitate the calculation of the cutoff sampling rate using kurtosis of the estimated sizes of the flows identified from sampled network traffic.

Figure 5:
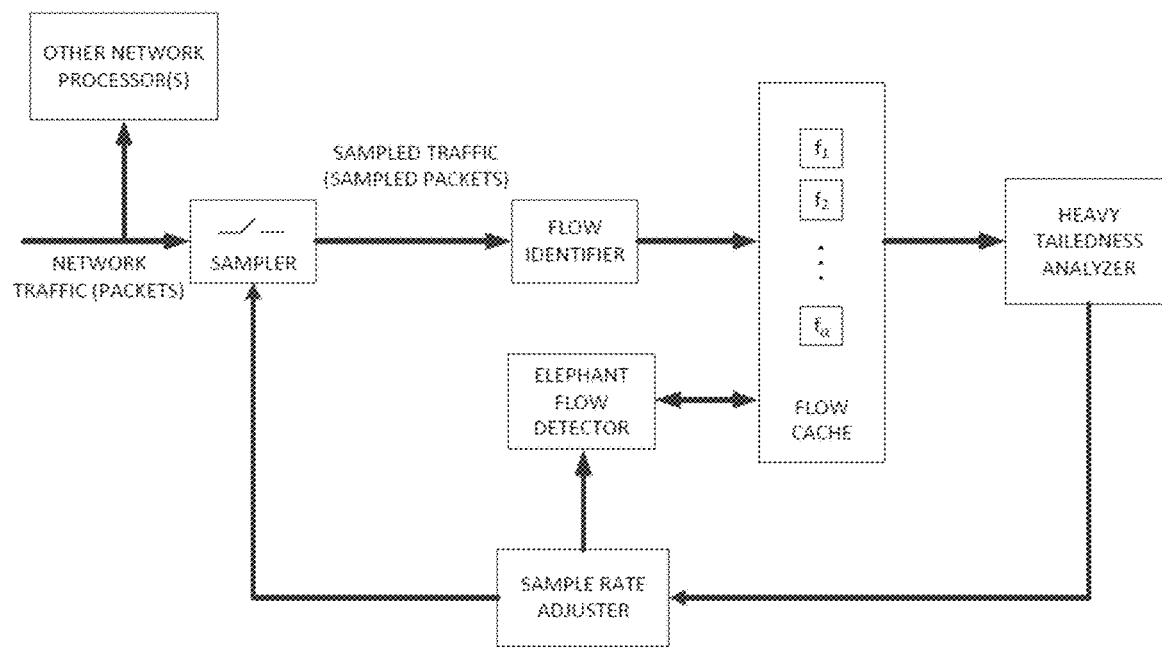
FIG. 5 schematically depicts a network device and components thereof, that can dynamically adjust the sampling rate and detect elephant flows, according to various embodiments.

With reference to FIG. 5, the network traffic (e.g., a stream of packets) is received at a Packet Sampler. The arriving packets are typically also forwarded to one or more Other Network Processors, e.g., for filtering, intrusion detection, routing to another network node, and/or delivery to a user device. The arriving packets are typically associated with several flows, such as an email communication, a chat message, a communication between Internet of Things (IoT) devices, sensor signals, web-server requests and responses, file transfers, audio/video file transfers, audio/video streaming, etc. These flows are defined in terms of applications, but they can be associated with source and destination address (e.g., IP address) pairs, source and destination ports, particular Virtual Local Area Network Identifiers (VLAN IDs), etc. Some of these flows, such as emails, chats, web-server requests and responses, can be relatively small in size (e.g., a few kilobytes, a few, tens, or hundreds of megabytes, etc.) Some flows, such as file transfers, audio/video uploads and downloads, can be relatively large (e.g., a few, tens, or hundreds of megabytes, a few, tens, or hundreds of gigabytes, terabytes, or even larger).

The rate of arrival of packets can be a few megabytes per second (Mbps), tens or hundreds of Mbps, a few gigabytes per second (Gbps), tens or hundreds of Gbps, a few terabytes per second (Tbps), or even more. The techniques described herein are not limited to any particular rate or a range of rates of arrival of packets, and can be used with present networks and future ones, that may process packets at different, typically higher rates. The sampling rate employed by the Sampler may be initially selected at random and/or based on known or estimated rate of arrival of packets at the sampler. The initially selected sampling rate is typically in the range of one in one or a few million packets (e.g., 0.000001) up to 1.0 (i.e., each arriving packet is sampled). If the rate of arrival of packets is known or estimated to be low (e.g., few, tens or hundreds of Mbps, a few Gbps, etc.), a relatively high (e.g., in the range from 0.00001 up to 1.0) initial sampling rate can be selected. Similarly, if the rate of arrival of packets is known or estimated to be high (e.g., tens or hundreds of Mbps, a few, tens, or hundreds of Gbps, etc.), a relatively low (e.g., in the range from 0.000001 up to 0.1) initial sampling rate can be selected.

The sampled packets are received at a Flow Identifier, which can examine the header of each sampled packet and determine a flow to which the packet belongs. This determination can be based on one or more of: an application associated with the packet, a source and destination address pair associated with the packet, a source and destination port pair associated with the packet, a particular VLAN ID associated with the packet, etc.

One or more of the identified flows are represented in a suitable data structure such as an array, a vector, a table, etc. The data structure can be referred to as a Flow Cache and may actually be created and operated within cache memory of a network processor, or in other memory accessible to the network processor. In some cases, each and every identified flow is represented in the Flow Cache. In other cases, the size of the cache/memory available for the Flow Cache may be limited and, as such, if there is no room for a newly detected flow in the Flow Cache, one or more flows of the smallest size(s) may be removed from the Flow Cache to allow representation of the newly detected flow. The total number of flows represented in the Flow Cache is denoted a. In theory, a can be as large as the total number of flows in the network, denoted |F|. In practice, however, a is typically less than |F|. In different embodiments, the Flow Cache may hold representations of tens, hundreds, thousands, hundreds of thousands, or even more flows, i.e., a can be in the range 1 to hundreds of thousands or more.

The representation of a flow in the Flow Cache includes an estimated size of the flow (also referred to as just size, for convenience). Each time a new sampled packet is determined to be associated with a previously detected flow that is already represented in the Flow Cache, the size of that flow is updated. The size may be determined according to a suitable metric such as: (i) a number of packets belonging to the flow at a time of estimation, (ii) a number of bytes belonging to the flow at the time of estimation, (iii) an average number of packets belonging to the flow per unit time, (iv) an average number of bytes belonging to the flow per the unit time, (v) bustiness of the flow, etc. Burstiness can be determined using known statistical techniques. In some cases, if the size of a flow represented in the Flow Cache is not updated for a specified period (e.g., a few, tens, or hundreds of milliseconds, a few seconds, etc.) called Inactivity Timeout, that flow is determined to be inactive, and is removed from the Flow Cache.

The Heavy Tailedness Analyzer uses a distribution of the sizes of the flows in the Flow Cache, and determines the heavy tailedness of the traffic. Different techniques can be used to determine the heavy tailedness of the network traffic using the flow information in the Flow Cache. For example, the variance and/or skewness of the estimated sizes of the flows in the Flow Cache, denoted $\{x_1, x_2, \ldots, x_\alpha\}$ can be used. The kurtosis of $\{x_1, x_2, \ldots, x_\alpha\}$ can effectively provide the degree to which the network traffic is heavy tailed. Any other techniques, including those that may be developed in the future, can be used to measure the heavy tailedness of $\{x_1, x_2, \ldots, x_\alpha\}$ can be used, as well. In some cases, the heavy tailedness is computed each time the Flow Cache is modified, either due to addition/removal of a flow and/or due to a size update. In some cases, the heavy tailedness is computed when the Flow Cache is modified a selected number (2, 5, 10, etc.) of times. In other cases, the heavy tailedness is computed periodically, according to a period (e.g., a few, tens, or hundreds of milliseconds, etc.) denoted Housekeeping Routine Timeout.

The Sampling Rate Adjuster then compares the computed heavy tailedness with a specified target. The target can be a known or benchmark heavy tailedness, i.e., the heavy tailedness of a known distribution such as Gaussian, Laplace, Sech-squared, Cauchy, or another distribution, or a fraction or a multiple of the known or benchmark heavy tailedness. In some cases, the target heavy tailedness can be a function such as min, max, average, etc., of the heavy tailedness that was measured for network traffic analyzed in the past. Examples of target heavy tailedness include values such as 10, 15, 25, 30, 40, 75, 100, etc.

In some cases, the comparison of the computed heavy tailedness and the target includes a determination whether the computed heavy tailedness is less than the target, or is greater than or equal to the target. If the computed heavy tailedness is less than the target, the Sampling Rate Analyzer may increase the sampling rate. In some cases, the sampling rate is increased only if the computed heavy tailedness is less than the target by a certain percentage (e.g., 0.5%, 1%, 2%, 5%, etc.). If the computed heavy tailedness is greater than the target, the Sampling Rate Analyzer may decrease the sampling rate. In some cases, the sampling rate is decreased only if the computed heavy tailedness is greater than target by a certain percentage (e.g., 0.5%, 1%, 2%, 5%, etc.).

In some cases, the sampling rate is adjusted only if the computed heavy tailedness is outside of a range associated with the target, such as ±1%, ±2%, ±5%, ±10%, etc., around the target. The range can be skewed around the target. In these cases as well, if the computed heavy tailedness is outside the range and is less than the target, the Sampling Rate Analyzer may increase the sampling rate, and if the computed heavy tailedness is outside the range and is greater than the target, the Sampling Rate Analyzer may decrease the sampling rate. In some cases, the sampling rate is increased/decreased according to a specified Sampling Rate Step Size (e.g., 0.000002; 0.000005; 0.00001; 0.00005; 0.002; 0.005; 0.01; etc.).

The sampling rate can also be increased/decreased based on a previous increase/decrease, such as by an amount equal to double or half or another multiple or fraction of the precious increase/decrease. The amount of increase/decrease in the sampling rate can also be selected at random within a range, e.g., from 0.000001 up to 0.05. Another way to choose the step size or amount to increase/decrease the sampling rate is determining how far the measured heavy tailedness is from the target. If the difference is large (e.g., more than 5%, 10%, 20%, 50% etc.) of the target, we can choose a large step size (e.g., 0.00001, 0.005, 0.02, etc.). If the difference is small (e.g., less than 25%, 15%, 10%, 5% 2%, 1%, etc.), we can choose a small step size (e.g., 0.000005, 0.00001, 0.002, etc.) to refine the sampling rate.

The Sampling Rate Adjuster provides the updated sampling rate to the Sampler, which may then sample the subsequently arriving packets at the updated sampling rate. The other components of the system would continue to operate as before, now analyzing packets sampled at the updated sampling rate. In some cases, when the Sampling Rate Analyzer determines that the computed heavy tailedness is equal to or greater than the target, or is within the specified range of the target, the Sampling Rate Adjuster signals the Elephant Flow Detector that the flow representation in the Flow Cache can be used to identify large/ elephant flows accurately. The Elephant Flow Detector may then select a specified number (up to a, where a can be 1, 2, 5, 10, 15, 20, etc.) of flows from the Flow Cache that have estimated sizes greater than estimated sizes of all other flows in the Flow Cache. The Flow Detector may designate these flows as large/elephant flows and other flows as small/mouse flows. Other processors in the system can use this information to provide QoS guarantees to the small/mouse flows.

Performance Benchmark

We demonstrated the performance of the BubbleCache process in a live high performance network environment. For these tests and without loss of generality, the BubbleCache process was configured with the following parameters: $\Phi=100$ (target kurtosis value), $\delta_p=0.01$ (sampling rate step size), $T_i=20$ seconds (connection inactivity timeout), $T_h=0.05$ seconds (housekeeping routine timeout). The rationale for choosing a target kurtosis value of 100 was to conservatively operate the process at a region where the quantum error is zero with very high probability. Notice that heavy tailed functions such as those presented in Examples 5 and 6 (Laplace, Cauchy, Sech-squared, and Gaussian distributions) have kurtosis values between 10 and 25; hence, a value of 100 ensures that the sampled traffic dataset is very heavy tailed. From Lemma 2, this in turn implies that the process operates at the zero quantum error region with high probability.

Figure 6:
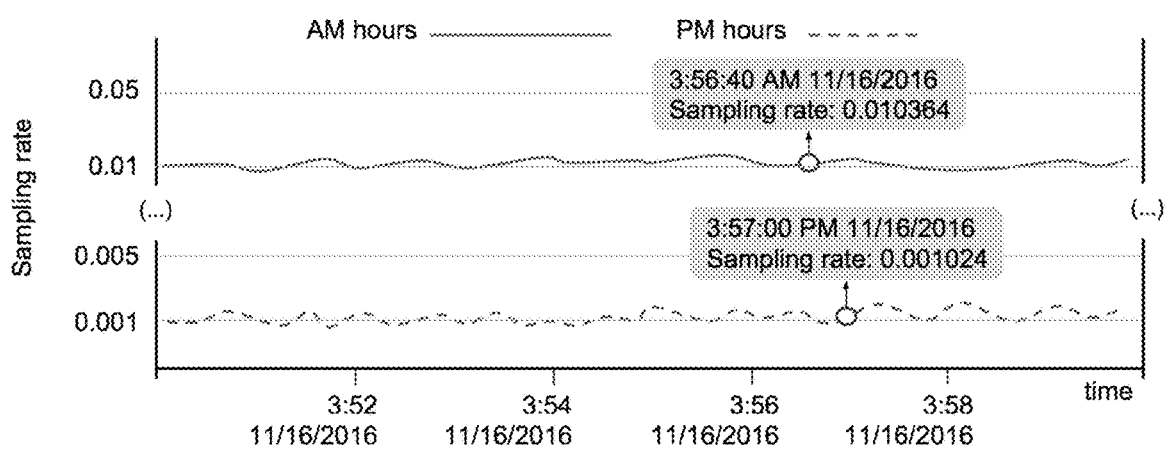
FIG. 6 shows the measurements of the cutoff sampling rates according to some embodiments, in a real world network.

FIG. 6 presents the sampling rates obtained from running the BubbleCache process for network traffic during high and low traffic hours. In the network of test, the traffic rate during high-traffic hours (during the day) was around 25 Gbps with peaks at 60 Gbps, whereas at low-traffic hours (at night) the traffic rate was around 1 Gbps or less. With a target kurtosis of 100, the cutoff sampling rate at high and low traffic hours was around 0.001 and 0.01, respectively. This result shows that at average traffic rates of about 25 Gbps, we can sample around 1 out of 1000 packets (a computational cost reduction of 1000 times) and still capture all the largest flows with high probability as the resulting sampled traffic dataset is very heavy tailed. It can be observed also that the higher the traffic rates, the lower the sampling rate can be reduced for a fixed target kurtosis level (i.e., a fixed degree of heavy tailedness). According to Lemma 2/R2, this implies that network traffic was more heavy tailed during the day.

Figures 7A, 7B:
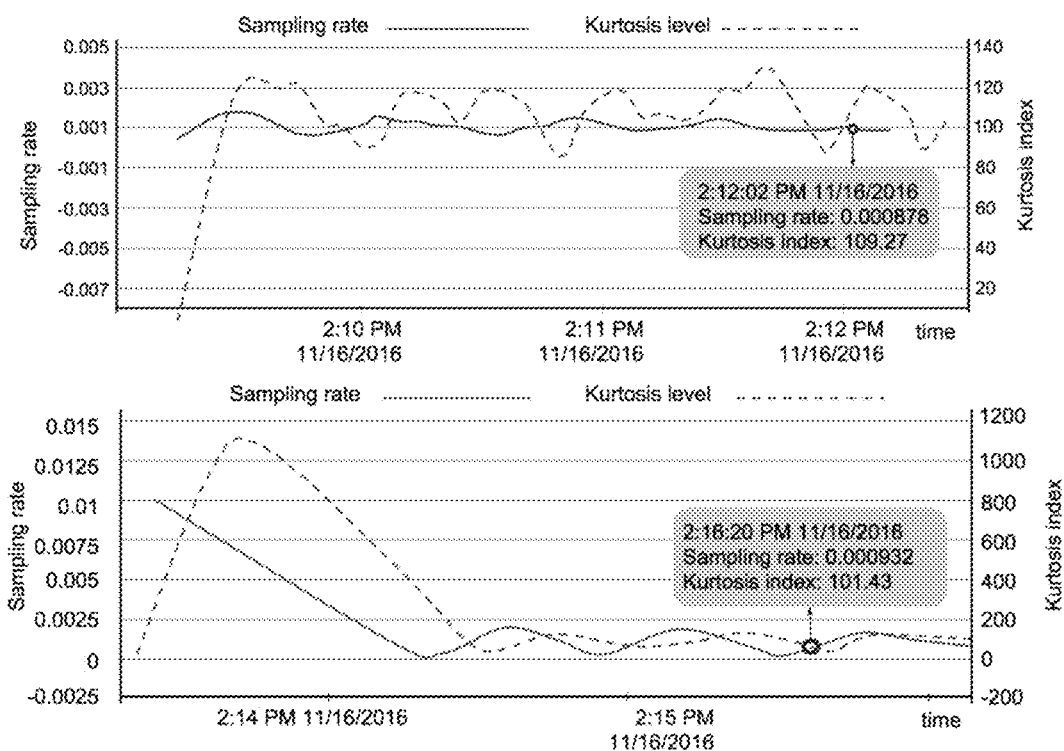
FIGS. 7A and 7B shows the convergence of the adjusted sampling rate and the measured heavy tailedness according to some embodiments, in a real world network.

FIGS. 7A and 7B shows a plot of the convergence of the sampling rate and the kurtosis parameters as the process is started from two different initial conditions and initial sampling rates during the high traffic hours. In FIG. 7A, the initial sampling rate was set to 0.0001, ten times below an optimized rate of 0.001, while in FIG. 7B, the initial sampling rate is set to 0.01, ten times above the optimized sampling rate. In both cases, within a few seconds, the process converged to the same cutoff sampling rate around 0.001. The convergence time was linear and its slope can be tuned by adjusting the sampling rate step size $\delta_p$ and the housekeeping routine timeout $T_h$ (FIG. 4A). Thus, the above plots show that, regardless of the initial conditions, the sampling rate can converge to the targeted kurtosis value of 100 and, upon convergence, both the sampling rate and the kurtosis parameters remained stable around their targets.

Figure 8:
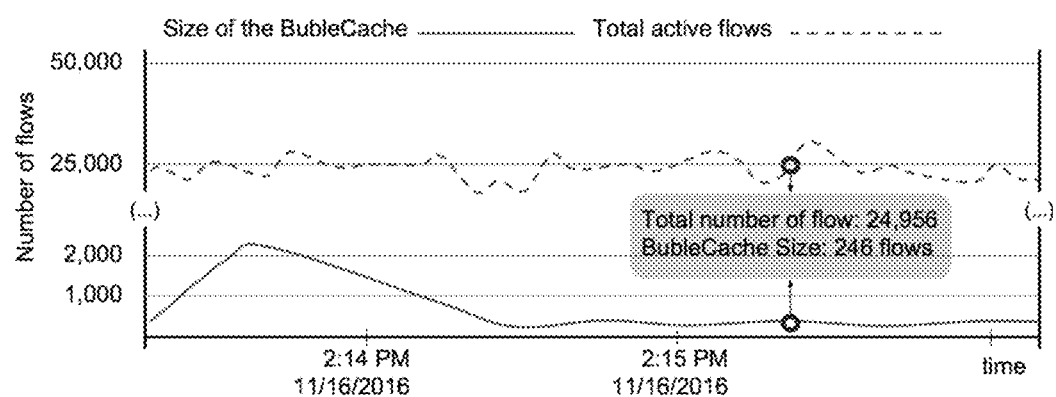
FIG. 8 shows the BubbleCache size according to various embodiments, in a real world network.

In addition to the computational savings described above, dynamically adjusted sampling described herein can also has a positive effect on the memory footprint requirements of the process: the higher the sampling rate, the smaller the size of the flow cache as more flows are generally filtered out. FIG. 8 illustrates the size of the BubbleCache (Flow Cache in FIG. 5) as a function of time as the algorithm converges to the cutoff rate of 0.001 from an initial sampling rate of 0.01. The total number of active flows in the network for this period is around 25,000. As the BubbleCache process is initiated, since the sampling rate is substantially above the cutoff rate, the size of the flow cache steadily increases reaching more than 2000 flow entries. Then as the sampling rate and the kurtosis level continue to decrease, the size of the cache begins to decrease until it reaches a stable point once the targeted kurtosis level of 100 is achieved. In steady state and with 25,000 active flows, the size of the flow cache stabilizes around 250 flows, which represents a 100 time reduction in memory size.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for classifying network flows, the method comprising:
    selecting a sampling rate, and sampling a plurality of packets arriving at a processing node at the sampling rate;
    identifying a plurality of flows, each flow being associated with at least one sampled packet;
    selecting a cache of flows from the plurality of flows, and estimating a respective size of each of the flows in the cache, each respective size comprising a rate of arrival of packets at the processing node;
    computing a heavy tailedness measure of the cache of flows based on a standardized moment of a distribution of respective sizes of the flows in the cache;
    adjusting the sampling rate for all flows in the cache based on the computed heavy tailedness measure if the computed heavy tailedness measure is outside of a specified range from a specified target heavy tailedness, the sampling rate being a same sampling rate for all flows in the cache of flows; and
    classifying a subset of flows having respective sizes larger than respective sizes of all other flows in the cache, as large flows.

2. The method of claim 1, wherein:
    prior to adjustment, the sampling rate is in a range from 0.000001 up to 1.0; and
    after at least one adjustment, the sampling rate is in a range from 0.00001 up to 0.1.

3. The method of claim 1, wherein the rate of arrival of packets at the processing node is in a range from 100 Mbps up to 10 Tbps.

4. The method of claim 1, wherein selecting the sampling rate comprises initially selecting a sampling rate that is inversely proportional to the rate of arrival of packets at the processing node.

5. The method of claim 1, wherein identifying a flow associated with a sampled packet comprises designating the sampled packet to a particular flow based on at least one of:
    a pair of source and destination addresses in a header of the sampled packet;
    a pair of source and destination port numbers in the header of the sampled packet; and
    a virtual local area network (VLAN) identifier included in the header of the sampled packet.

6. The method of claim 1, wherein selecting the cache of flows comprises including each flow in the identified plurality of flows in the cache of flows.

7. The method of claim 6, wherein selecting the cache of flows further comprises:
    determining that no additional sampled packets were associated with a particular flow during an inactivity timeout period; and
    removing that particular flow from the cache of flows.

8. The method of claim 1, wherein:
    the size of a flow is based on a metric selected from the group consisting of: (i) a number of packets belonging to the flow at a time of estimation, (ii) a number of bytes belonging to the flow at the time of estimation, (iii) an average number of packets belonging to the flow per unit time, (iv) an average number of bytes belonging to the flow per the unit time, and (v) bustiness of the flow; and
    estimating the size of the flow comprises computing the metric.

9. The method of claim 1, wherein computing the heavy tailedness measure of the cache of flows comprises computing at least one of:
    variance of the respective flow sizes;
    skewness of the respective flow sizes; and
    kurtosis of the respective flow sizes.

10. The method of claim 1, wherein after adjusting the sampling rate, the sampling rate is not adjusted at least for a specified rate adjustment interval.

11. The method of claim 1, wherein adjusting the sampling rate comprises one of:
    increasing the sampling rate if the computed heavy tailedness measure is less than the specified target heavy tailedness; and
    decreasing the sampling rate if the computed heavy tailedness measure is greater than the specified target heavy tailedness.

12. The method of claim 11, wherein:
    increasing the sampling rate comprises increasing the sampling rate by a selected step size; and
    decreasing the sampling rate comprises decreasing the sampling rate by the selected step size.

13. A system for classifying network flows, the system comprising:
    a first processor; and
    a first memory in electrical communication with the first processor, the first memory comprising instructions which, when executed by a processing unit comprising at least one of the first processor and a second processor, and in electronic communication with a memory module comprising at least one of the first memory and a second memory, configure the processing unit to:
    select a sampling rate, and sampling a plurality of packets arriving at a processing node at the sampling rate;
    identify a plurality of flows, each flow being associated with at least one sampled packet;
    select a cache of flows from the plurality of flows, and estimating a respective size of each of the flows in the cache, each respective size comprising a rate of arrival of packets at the processing node;
    compute a heavy tailedness measure of the cache of flows based on a standardized moment of a distribution of respective sizes of the flows in the cache;
    adjust the sampling rate for all flows in the cache based on the computed heavy tailedness measure if the computed heavy tailedness measure is outside of a specified range from a specified target heavy tailedness, the sampling rate being a same sampling rate for all flows in the cache of flows; and
    classify a subset of flows having respective sizes larger than respective sizes of all other flows in the cache, as large flows.

14. The system of claim 13, wherein:
    prior to adjustment, the sampling rate is in a range from 0.000001 up to 1.0; and
    after at least one adjustment, the sampling rate is in a range from 0.00001 up to 0.1.

15. The system of claim 13, wherein the rate of arrival of packets at the processing node is in a range from 100 Mbps up to 10 Tbps.

16. The system of claim 13, wherein to select the sampling rate the instructions program the processing unit to select initially a sampling rate that is inversely proportional to the rate of arrival of packets at the processing node.

17. The system of claim 13, wherein to identify a flow associated with a sampled packet the instructions program the processing unit to designate the sampled packet to a particular flow based on at least one of:
    a pair of source and destination addresses in a header of the sampled packet;
    a pair of source and destination port numbers in the header of the sampled packet; and
    a virtual local area network (VLAN) identifier included in the header of the sampled packet.

18. The system of claim 13, wherein to select the cache of flows the instructions program the processing unit to include each flow in the identified plurality of flows in the cache of flows.

19. The system of claim 18, wherein to select the cache of flows the instructions further program the processing unit to:
    determine that no additional sampled packets were associated with a particular flow during an inactivity timeout period; and
    remove that particular flow from the cache of flows.

20. The system of claim 13, wherein:
    the size of a flow is based on a metric selected from the group consisting of: (i) a number of packets belonging to the flow at a time of estimation, (ii) a number of bytes belonging to the flow at the time of estimation, (iii) an average number of packets belonging to the flow per unit time, (iv) an average number of bytes belonging to the flow per the unit time, and (v) bustiness of the flow; and
    to estimate the size of the flow the instructions program the processing unit to compute the metric.

21. The system of claim 13, wherein to compute the heavy tailedness measure of the cache of flows the instructions program the processing unit to compute at least one of:
    variance of the respective flow sizes;
    skewness of the respective flow sizes; and
    kurtosis of the respective flow sizes.

22. The system of claim 13, wherein the instructions program the processing unit not to adjust the sampling rate at least for a specified rate adjustment interval, after adjusting the sampling rate.

23. The system of claim 13, wherein to adjust the sampling rate the instructions program the processing unit to one of:
    increase the sampling rate if the computed heavy tailedness measure is less than the specified target heavy tailedness; and
    decrease the sampling rate if the computed heavy tailedness measure is greater than the specified target heavy tailedness.

24. The system of claim 23, wherein:
    to increase the sampling rate the instructions program the processing unit to increase the sampling rate by a selected step size; and
    to decrease the sampling rate the instructions program the processing unit to decrease the sampling rate by the selected step size.

* * * * *